United States Patent [19]

Tiedeman

[11] Patent Number: 4,483,429
[45] Date of Patent: Nov. 20, 1984

[54] DUAL FUNCTION TORQUE LIMITER/NO-BACK DEVICE

[75] Inventor: Robert K. Tiedeman, Wayne, N.J.
[73] Assignee: Curtiss-Wright Flight Systems, Inc., Fairfield, N.J.
[21] Appl. No.: 338,044
[22] Filed: Jan. 8, 1982
[51] Int. Cl.³ .......................... B60K 41/24; B60T 7/12
[52] U.S. Cl. .................................. 192/18 R; 192/18 R
[58] Field of Search ................ 192/7, 8 R, 8 A, 8 C, 192/4 R, 15, 18 R; 188/134

[56] References Cited

U.S. PATENT DOCUMENTS

| 3,596,740 | 8/1971 | Nau | 192/8 R |
|---|---|---|---|
| 4,046,235 | 9/1977 | Shutt | 192/8 R |
| 4,176,733 | 12/1979 | Twickler | 192/8 R |

*Primary Examiner*—George H. Krizmanich
*Attorney, Agent, or Firm*—Arthur L. Frederick

[57] ABSTRACT

A dual function torque limiter/no-back device for limiting torque to an output member and for preventing transmission of torque from such output member comprising a casing, an input member supported for rotation in the casing and connected to a source of rotary power to be driven by the latter. Also an output member is supported for rotation in the casing and connected to a load to be rotated. A drive coupling assembly is connected to the input and output members for transmitting torque from the input member to the output member and having torque response means operative at a predetermined torque value. A brake assembly is disposed in the housing and is operative to positions of engagement and disengagement. A brake coupling assembly is provided for connecting the drive coupling assembly, the output member and the brake assembly to effect engagement of the brake assembly upon the predetermined torque value being reached and for effecting engagement of the brake assembly upon torque being transmitted from the output member.

16 Claims, 19 Drawing Figures

DUAL FUNCTION TORQUE LIMITER/NO-BACK DEVICE

BACKGROUND OF THE INVENTION

The invention generally relates to devices for limiting torque to a predetermined torque value, torque limiters, and for preventing transmission of torque from a driven member through its output means to its input means, no-back devices. More particularly, this invention relates to a dual-full function torque limiter/no-back device having a brake section which is utilized to provide both torque limiting and no-back functions.

Single function torque limiters and single function no-back devices which actuate a braking section incorporated in said devices are well known in the art. Furthermore, a "combination no-back brake and torque limiter assembly" utilizing a drive coupling assembly or clutch of the ball-detent type is known in the prior art, namely U.S. Pat. No. 4,176,733. It is used, as in this invention, in various types of actuator for aircraft components, where both functions must be provided and where space and weight limitations are severe requirements. This device is both bi-directional, that is, it operates in the same manner whether the input torque is clockwise or counterclockwise, and bilateral or symmetrical with respect to its "output" torque characteristics. This is to say that its "output" torque characteristics are identical for torque applied through either its designated input or output shafts. Such bilateral device has three phases of operation and they are identical regardless of which shaft the torque is applied. When the input torque is below a first predetermined, minimum torque level, the brake assembly is in pressure engagement and the output torque is maintained at a zero torque level. To be more specific, the brake's pressure engagement is progressively released as the input torque increases until the first predetermined, minimum, torque level is reached at which point the brake is released and is moved to a null position or mid-position where there is no torque resistance due to the brake; prior to such null position being reached, the output torque is at a zero torque level. The null position is reached when the balls of the drive coupling assembly travel to the end of its inner, first, ramp section thereby fully overcoming an axial pre-load of its associated spring. Then the input torque above such first predetermined, minimum, level is freely transmitted to the output shaft. As the input torque level increases toward a second predetermined maximum torque level, these balls move onto an outer second ramp section, and progressively therealong, to increase the spacing between the drive discs of the drive coupling assembly, until the brake assembly is again engaged, albeit in a different manner, when the input torque level reaches this maximum level to limit the torque level at the output shaft.

SUMMARY OF THE INVENTION

The preferred embodiment of the invention, a device for limiting torque and for preventing transmission of torque from a driven member comprises a casing, an input means supported for rotation therein, and an output means coupled to the driven means and supported for rotation in the casing. A first coupling means or drive coupling assembly is connected to the input and output means for transmitting torque from the input to the output and having torque responsive means operative at a predetermined value. A brake means is disposed in the casing and is operative to positions of engagement and disengagement. A second coupling means is provided for connecting the first coupling means, output, and brake means, to effect engagement of the brake means upon said predetermined torque value and for effecting engagement of the brake means upon torque transmitted from said driven means. The first coupling means or brake coupling assembly transmits all torque from the input to the output below said predetermined torque value and the second coupling means effects engagement of the brake upon any torque transmitted from the driven means. The first coupling means includes a plurality of opposing first discs, its torque responsive means is disposed against one of the discs for slidably displacing, in an axial direction, one of these discs. The brake means comprises a pair of separately and oppositely disposed brake assemblies connected to said casing and biasing means for maintaining the brake means disengaged in the absence of torque from the input means and during the transmission of all torque from the input means below the predetermined value. The second coupling means effects engagement of the brake means only upon said predetermined torque value and only upon any torque transmitted from the driven means independent of the level of torque at the input means. The second coupling means is also responsive to the first coupling means for actuating said brake means only upon said predetermined torque and is responsive to said output means for actuating said brake means only upon torque transmitted from said driven means. The second coupling means further comprises camming means mounted for separate axial movement with respect to the first coupling means or a pair of interrelated members mounted for independent axial movement with respect to said first coupling means. The camming means is mounted for conjoined rotation with and on said first coupling means and comprises a pair of annular disc-shaped opposing members which are mounted for conjoined rotational and independent axial movement with said first coupling means and are disposed coaxially with respect thereto. Furthermore, the camming means is disposed between the pair of oppositely disposed brake assemblies.

A general object of the invention is to provide an improved dual function torque limiter/no-back device.

A further object of the invention is to provide a unilateral dual function torque limiter/no-back device.

Another object of the invention is to provide a bi-directional dual function torque limiter/no-back device having asymmetrical "output" torque characteristics.

An additional object of the invention is to provide a dual function torque limiter/no-back device which transmits all torque from the input to the output below a predetermined torque level.

Still another object of the invention is to provide a dual function torque limiter/no-back device which blocks the transmission of any torque from the driven means.

A further object of the present invention is to provide a dual function torque limiter/no-back device having a reduced size, weight and complexity.

Another object of the present invention is to provide a dual function torque limiter/no-back device wherein its torque limiting setting is easily adjustable during assembly to meet specified requirements over a wide range of settings.

The foregoing and various other objects, features and advantages of the invention will become more apparent and understandable as the description proceeds herein below, with reference taken to the accompanying drawings which illustrate, by way of example only, some embodiments of the invention and in which like reference characters denote the corresponding parts of the several views.

DESCRIPTION OF THE INVENTION

FIGS. 1-16 illustrate the invention's preferred embodiment, a device for limiting torque and for preventing the transmission of torque from a driven member or dual torque limiter/no-back. In these figures, said device is designated generally as 21. Referring particularly to FIGS. 1-5, the dual torque limiter/no-back 21 comprises seven major subassemblies, a casing or housing assembly 23, an input means or input shaft 25 supported for rotation in said casing 23, an output means 27 coupled to a driven member or load (not shown), and supported for rotation in said casing 23, a first coupling means (hereinafter referred to as a "drive coupling assembly") generally designated 29 connected to said input shaft 25 and said output means 27 for transmitting torque from the input shaft 25 to the output means 27, which drive coupling assembly 29 includes a torque responsive means operative at a predetermined torque value, a brake means or brake assembly or brake designated generally as 31, disposed in said casing 25 and operative to positions of engagement or braking and disengagement or unengagement, and a second coupling means (hereinafter referred to as a "brake coupling assembly") designated generally as 33, for connecting said drive coupling assembly 29, said output means 27, and said brake 31 to effect engagement of said brake 31 upon said predetermined torque value and for effecting engagement of said brake 31 upon torque transmitted from the load. An indicator assembly 30 is connected to drive coupling assembly 29.

To be more specific, the casing assembly 23 comprises a splined housing 32 and an end plate closure member 34 interconnected by tongues and grooves. Input shaft 25 comprises an elongated shaft rotatably mounted having outer and inner ends 37 and 39, respectively, inner threaded portion 41 which includes upper and lower flat portions 43, and slot 45 and a hole 47 for a pin connection, its inner end 37 is rotatably mounted by a bearing 48 in the housing 32. The output means 27 comprises an outer, tubular output drive shaft portion 49 extending through the end plate closure member 34 of the casing 23 and an inner, cup-shaped portion 51 extending within the casing's housing 32 and having a spline 53 formed on the top surface of its inner end extending completely around its circumference and a pair of diametrically opposing slots 55 (see FIG. 2) formed in its lower surface; the output drive shaft 49 is received in a bearing 57 in the end plate closure member 34, which abuts a shim 59, and is coaxially and rotatably mounted on an inner end 39 of the input shaft 25 by a bearing 61 carried by said input shaft 25 which abuts one side of a spacer 63 which, in turn, abuts against an inner wall of the cup-shaped portion 51 of output means 27.

The drive coupling assembly 29 comprises an input drive member 65, an output disc or output drive member 75, a cam plate 83, ball and retainer assembly 85, torque locking and adjusting assembly 87, and a biasing spring means 89. The input drive member 65 has a sleeve or hub portion 67 which is fixed to input shaft 25 by a pin connection and has an input disc portion or input disc 69 having a pair of diametrically opposed driving lugs or tangs 71 radially extending from the outer periphery or outer edge 73 of the input disc 69. The output drive member or output disc 75 is spaced from and rotatively and slidably mounted coaxially with respect to input shaft 25 and disposed axially from opposing input disc 69. Output disc 75 has a lip portion 77 at its inner periphery extending towards said input drive member 65 and has a pair of diametrically opposed output driving lugs or tangs 79 radially extending from the outer periphery or outer edge 81 of the output disc 75 which fit loosely within complementary slots 55 of output means 27. The spring means 89, comprises a series of discs or Belleville spring washers designated generally by the reference number 91, which coaxially surround the input shaft 25, as does a thrust washer and bearing assembly 93 which is disposed against an inner face of output disc 75 and supported on its lip portion 77. When the Belleville spring washers 91 are disposed between the inner face of input disc 69 of input drive member 65 and the inner face of output disc 75 through thrust washer and bearing assembly 93, they are compressed and urge said output disc 75 toward the cam plate 83. The cam plate 83 has an aperture 95 within which the threaded and flat portions, 41 and 43, respectively. of input shaft 25, complementarily fits therethrough and provides slidable support therefor and rotates therewith. Disposed between said cam plate 83 and rotatably supporting said output disc 75, is a conventional ball and retainer assembly 85 (which also is supported by said cam plate 83) which comprises a plurality of balls or rolling elements 97 preferably three, and a disc shaped ball retainer 99 which supports and retains these balls 97 at equally spaced intervals around its circumference and into a plurality of complementary configured ball detent sockets, described infra, formed in opposing faces of cam plate 83 and output disc 75. The torque locking and adjusting assembly 87 comprises a lock washer 101 having a single lower key 103 and a plurality of circumferentially spaced upper keys 105 (only one of which is shown) and an abutting adjustment spanner nut 107 having a plurality of circumferentially spaced recesses 109 formed therein. The nut 107 engages the threaded portion 41 of input shaft 25 and abuts lock washer 101 whose lower key 103 is adapted to slidably fit within the corresponding slot 45 formed on said threaded portion 41 and one of whose upper keys 105 is adapted to be bent into one of the recesses 109 of the nut 107. The compression of the Belleville spring washers 91 can be changed or adjusted by axially positioning the adjustment nut 105 to any position on the threaded portion 41 to provide for a predetermined torque limiting value or setting.

The brake 31 comprises separately and oppositely disposed major brake pack 111 and a minor brake pack 113, both of which are connected to the housing 32 and between which the brake coupling assembly 33 is disposed. The major brake pack 111 comprises a first series of brake plates or discs 115 in the form of annular plates having their outer periphery engaging the splined housing 32 for slidable axial movement on its spline. A second series of brake plates or discs 117, also in the form of annular plates but having their inner periphery engaging the output means' spline 53 for slidable axial movement thereupon are interleaved with the first series of brake discs 115. A series of wave spring washers or biasing means for maintaining the brake means 31 disengaged in the absence of torque from the input means 25 during the transmission of all torque from the input means 25 below a predetermined torque, 118, are interleaved between the first series of brake plates 115 in the spaces above the top edges of the second series of brake plates 117 and between a shoulder of an outermost or end brake plates 119 of the first series of brake plates 115 and its adjacent brake plate of the same series as well as between an innermost brake plate 121 of this series and the shoulder of an adjacent member of the brake coupling assembly 33, described infra. These wave spring washers 118 maintain the brake means 31 disengaged by maintaining a minimum clearance between the brake plates of each series. The outermost brake plate 119 is sufficiently spaced from an upper inner end or flange 123 of end plate closure member 34 to prevent any reaction therebetween, and abuts and reacts against a three element assembly comprising a roller bearing 125, a thrust plate 127, and a shim 129, all of which are coaxially mounted below said flange 123 and abut against a shoulder portion 131 of said end plate closure member 34. The minor brake pack 113 is similar to the major brake pack 111 but primarily differs therefrom in that half the number of brake elements are utilized. It also includes a first series of brake plates 115, two in number, engaging the splined housing 32 for slidable movement and a single brake plate or disc 133, disposed between said two adjacent brake plates 115 in the form of an annular plate but having a pair of diametrically opposed lugs or tangs 135 radially extending from its inner periphery and which is supported by brake coupling assembly 33, described infra, for rotational and axial movement. Another series of wave spring washers 118, two in number, are also interleaved between the two brake plates 115 and the shoulder of an adjacent member of the brake coupling assembly 33, described infra, and also function as biasing means for the same general purpose as the corresponding wave spring washers 118 of the major brake pack 111. Its outermost brake plate 119 abuts and axially reacts against a thrust washer and bearing assembly 137 coaxially disposed between said aforementioned brake plate 119 and the inner face of the end wall of housing 32 and is coaxially supported for rotational and axial movement by said coupling means 33. Thrust bearing assembly 137 of the minor brake pack 113 provide an axial braking surface without restricting rotative motion, for the brake plates when they are compressed into pressure engagement with each other by the input coupling member 143, when the minor brake pack 113 is actuated. Furthermore, since such thrust bearing assembly 137 is under compression when the minor brake pack 113 is actuated, it assists in releasing said minor brake pack 113 when the operative conditions for engaging said minor brake pack 113 are no longer present, by axially moving their brake plates inwardly thereby tending to disengage said minor brake pack 113 and resetting it to its disengaged position. The roller bearing 125 and thrust plate 129 serve generally the same purpose for the major brake pack 111.

The brake coupling assembly 33 functions to effect engagement of the brake 31 only upon said predetermined torque value and only upon any torque transmitted from the driven means or load and independent of the level of torque at the input means 25. Furthermore, the coupling means 33 rotatively moves, in response to drive coupling assembly 29, during the transmission of all torque from the input means 25, regardless of the level of torque so long as it is below said predetermined value. It also rotatively moves in response to the output means 27 upon any level of torque being transmitted therethrough from the driven means or load. More specifically, the brake coupling assembly 33 comprises camming means or a pair of interrelated members designated generally 139, mounted for both conjoined rotational movement with and on drive coupling assembly 29 and for separate and independent axial movement with respect to the drive coupling assembly 29 and disposed coaxially therewith. Said camming means 139 comprises a pair of annular, disc-shaped, opposing output and input coupling members, 141 and 143, respectively, a plurality of balls 145, each of which, in the preferred embodiment, is approximately eight tenths of a centimeter in diameter, preferably three pair, and a disc-shaped ball retainer 147 which support and retains each pair of balls 145 at equally spaced intervals around its circumference and into a plurality of pairs of complementary configured ball detent sockets, described infra, formed in opposing faces of coupling members 141 and 143. The output coupling member 141 is disposed coaxially to said output means 27 and is mounted upon said output means 27 at its inner periphery which engages the output means' spline 53 for both independent slidable axial movement thereupon and conjoined rotation therewith and said associated brake plates 115, and slidable axial movement with both series of brake plates 115 and 117 of major brake pack 111. The input coupling member 143 is disposed coaxially to said input disc 69 of said input drive member 65 and includes a pair of diametrically opposing slots 149 formed in its lower peripheral edge within which the complementary tangs 71 of said input disc 69 fit loosely within thereby engaging the input disc 69 for both independent slidable axial movement thereupon and conjoined rotation therewith. The input coupling member 143 further includes, on its outer face, at its lower peripheral edge, two pairs of axially or traversely extending arcuate driving tangs 151 forming a pair of complementary diametrically opposing slots 153 each of which is spaced ninety degrees from peripheral slots 149, and within which complementary tangs 135 of said minor brake pack's brake plate 133 fit loosely within thereby engaging said brake plate 133 for conjoined rotation and slidable axial movement therewith and slidable axial movement with the associated brake plates 115 of said minor brake pack 113.

Figure 1:
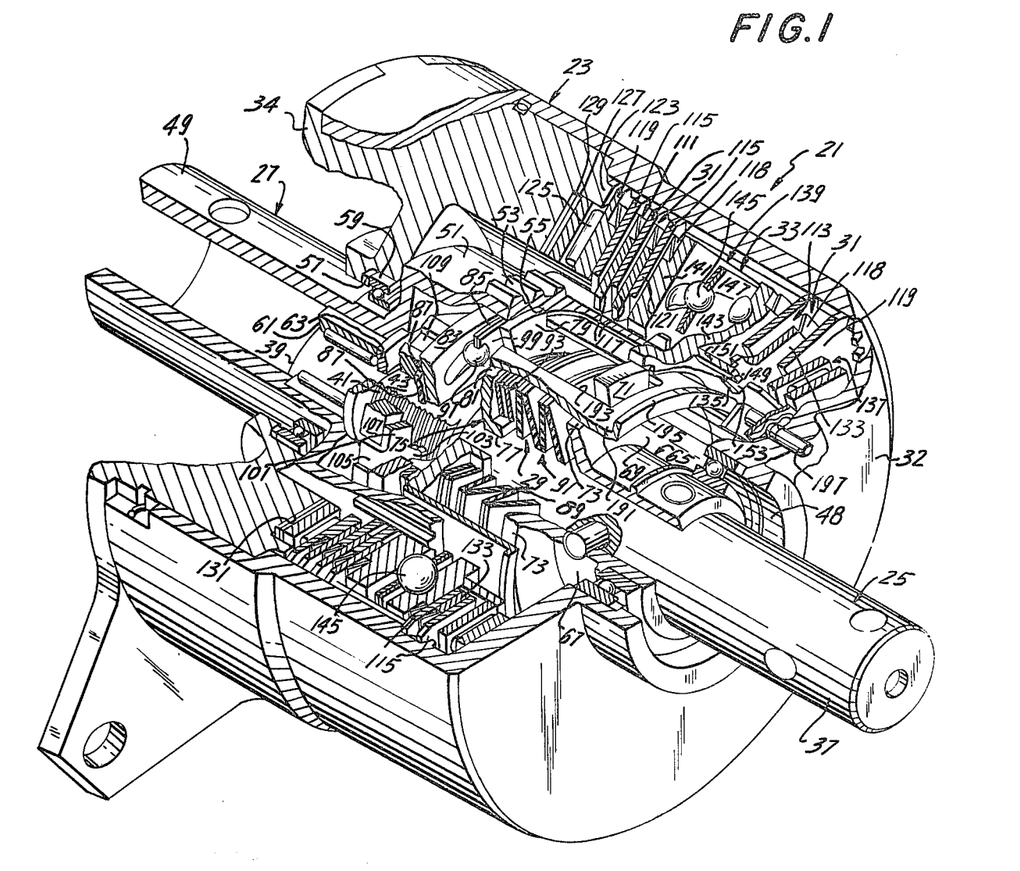
FIG. 1 is a perspective view of the preferred embodiment of the device for limiting torque and for preventing transmission of torque from a driven member.
Figure 2:
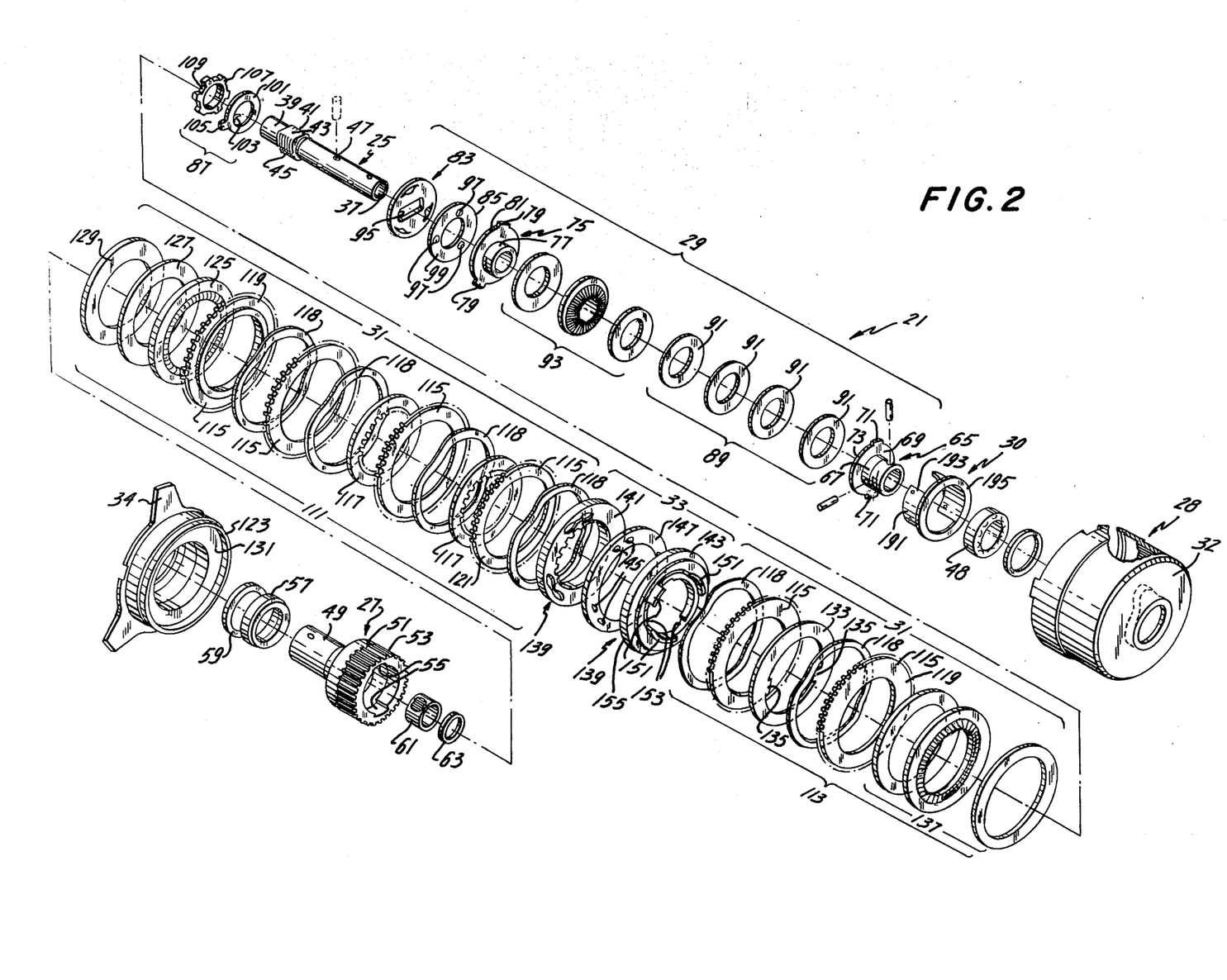
FIG. 2 is a perspective exploded view of the preferred embodiment of FIG. 1.
Figure 3:
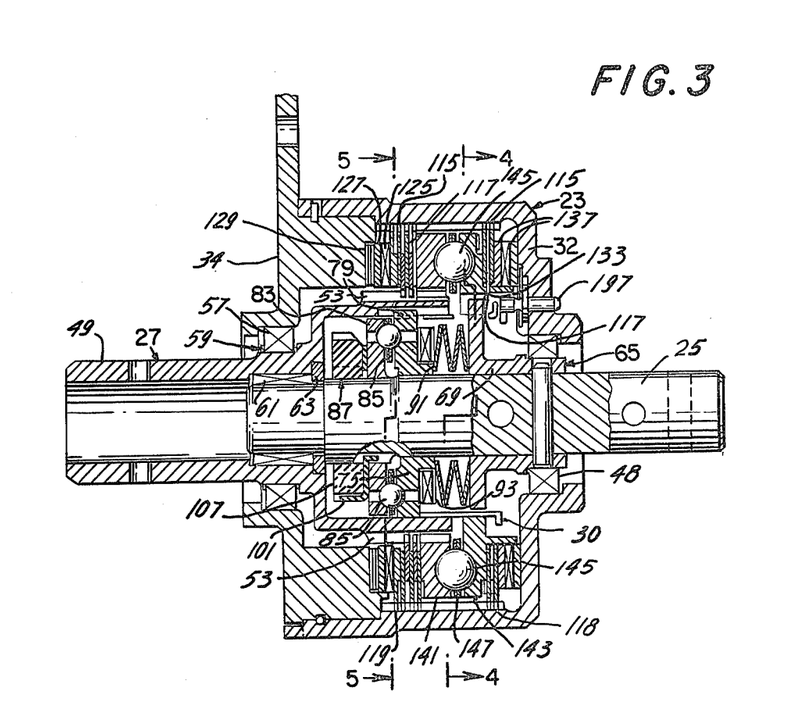
FIG. 3 is an axial cross sectional view of the preferred embodiment of FIG. 1.
Figure 4:
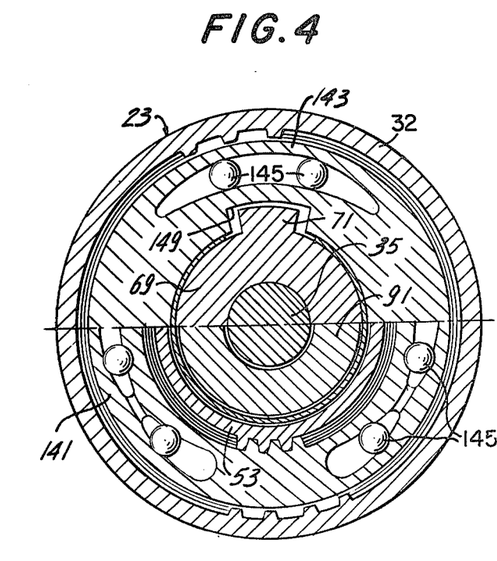
FIG. 4 is a transverse sectional view taken along the line 4—4 of FIG. 3.
Figure 5:
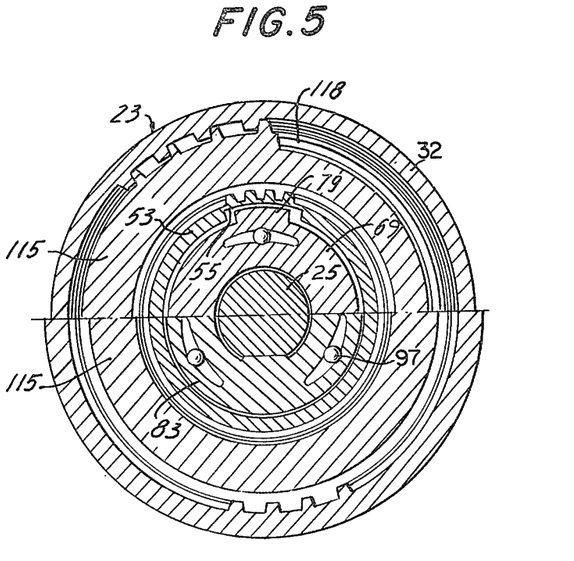
FIG. 5 is another transverse sectional view, partially broken away, taken along the line 5—5 of FIG. 3.
Figure 6:
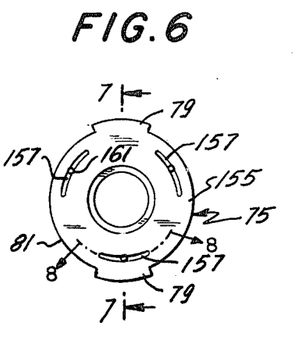
FIG. 6 is an end view of the output drive disc of the first coupling means or drive coupling assembly as seen from the right of FIG. 1.
Figure 7:
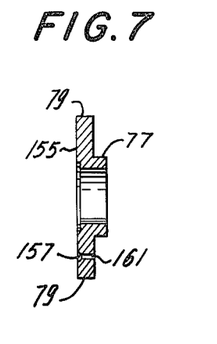
FIG. 7 is a transverse sectional view taken along the line 7—7 of FIG. 6.
Figure 8:
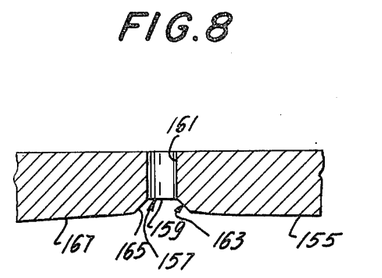
FIG. 8 is an enlarged fragmentary sectional view of the output drive disc's ball detent socket of the drive coupling assembly taken along the line 8—8 of FIG. 6.
Figure 9:
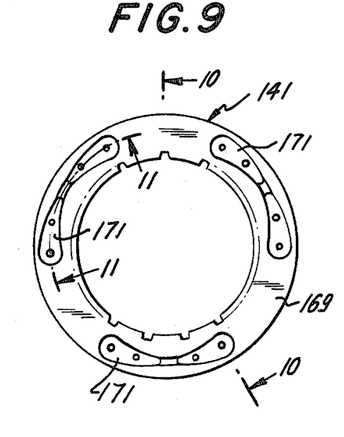
FIG. 9 is an end view of the brake coupling assembly as seen from the right of FIG. 1.
Figure 10:
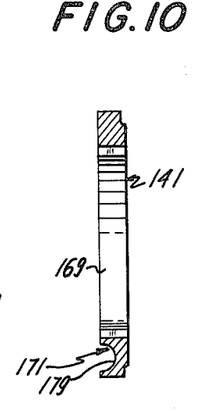
FIG. 10 is a transverse developed sectional view taken along the line 10—10 of FIG. 9.
Figure 11:
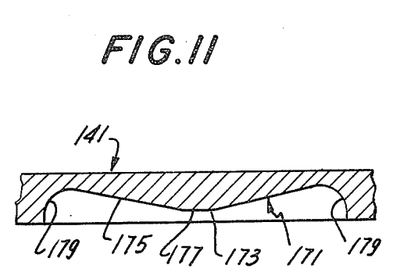
FIG. 11 is an enlarged fragmentary developed sectional view of a ball detent socket output member of the brake coupling assembly taken along the line 11—11 of FIG. 9.
Figure 12:
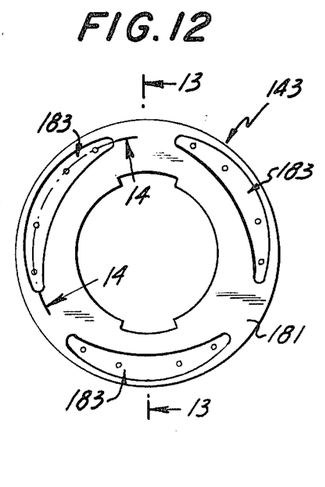
FIG. 12 is an end view of the input disc of the brake coupling assembly as seen from the left of FIG. 1.
Figure 13:
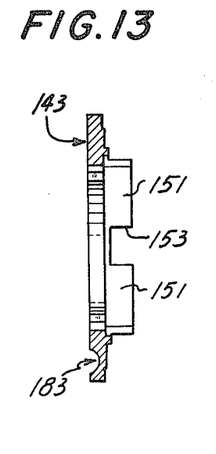
FIG. 13 is a transverse sectional view taken along the line 13—13 of FIG. 12.
Figure 14:
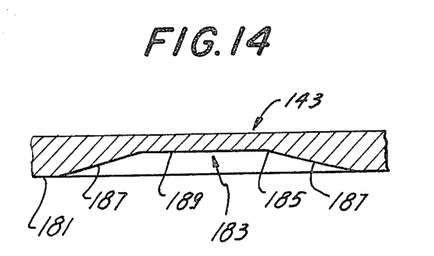
FIG. 14 is an enlarged fragmentary developed sectional view of a ball detent socket of the input disc taken along the line 14—14 of FIG. 12.

Referring now particularly to FIGS. 6–8 wherein output drive disc 75 is illustrated in detail, its inner face 155 includes a plurality, preferably three, elongated ball detent sockets 157 whose centers are located on a circular locus which is concentric with input shaft 25 and which are radially equally spaced from the centerline of said input shaft 25. Each of the detent sockets 157 subtends a radial arc from said center of said input shaft 25 of approximately forty-five degrees and has a first portion 159 formed by an opening 161 whereby a ball 97 which, in the preferred embodiment, is approximately a half a centimeter in diameter, and which is positioned against its periphery and a ramp 163 having a first inclined section 165, which in the preferred embodiment, is at an angle of approximately forty-five degrees to the face 155 of the drive disc 75, followed by a second inclined section 167, which in the preferred embodiment, is at an angle of approximately three degrees to the face 155 of the drive disc 75. The inclined sections are gradually curved at their points of intersections. The detent sockets and their locations are the same for both output drive disc 75 and its cooperating member, cam plate 83, and both detent sockets are shown in an enlarged view in FIG. 15.

Figure 15:
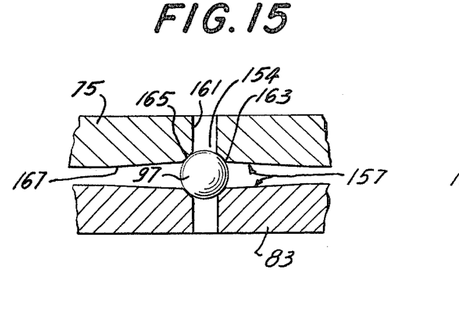
FIG. 15 is a diagrammatic fragmentary view of the output disc and cam plate members' ball and ball detent socket of the drive coupling positioned in the normal mode of torque transmission with the brake disengaged.
Figure 16:
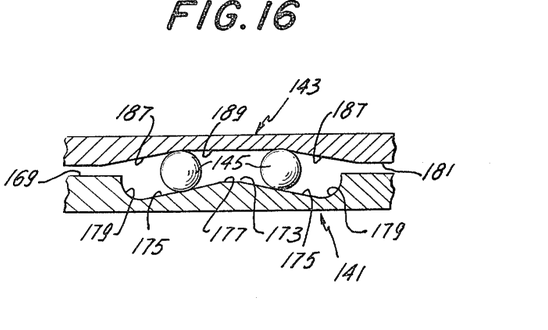
FIG. 16 is a diagrammatic fragmentary view of the brake coupling assembly showing the balls and ball detent sockets positioned in the normal mode of torque transmission when the brake disengaged.

Referring now particularly to FIGS. 9–14 and 16, which illustrate in detail output coupling member 141 and input coupling member 143, output coupling member 141 includes, on its inner face 169, a plurality, preferably three, of elongated, dual-portioned ball detent sockets 171 whose centers are also located on a circular locus which is concentric with input shaft 25 all of which are radially equally spaced from the centerline of said input shaft 25. Each of the dual-portioned detent sockets 171 subtends a radial arc of approximately seventy-five degrees and has a ramp 173 having a first, inclined, section 175, which in the preferred embodiment, is at an angle of approximately ten degrees to the face 169 of the output coupling member 141 followed by a second section 177, which in the preferred embodiment is flat and recessed parallel to the face 169; the lower end of the inclined section 175 terminates in a curved end 179 whose radius is the same as the balls 145 associated therewith. Input coupling member 143 includes, on its inner face 181, a plurality, preferably three of elongated ball detent sockets 183 whose centers are also located on a circular locus which is concentric with the input shaft 25, all of which are radially equally spaced from the centerline of said input shaft 25. Each of the detent sockets 183 subtends a radial arc of approximately ninety-five degrees and has a ramp 185 having a first inclined section 187, which in the preferred embodiment is at an angle of approximately ten degrees to the face 181 of the input coupling member 143 followed by a second section 189, which in the preferred embodiment is flat and recessed parallel to the face 181. During normal torque transmission from the input shaft 25, when torque is below the predetermined value, the output drive disc 75 and the cam plate 83 are positioned as shown in FIG. 15 and the brake 31 is disengaged and input and output coupling members 143 amd 141, respectively, of the coupling means are positioned as shown in FIG. 16.

The indicator assembly 30, connected to the drive coupling assembly 29, comprises a cylindrical member 191, having an enlarged slot 193 whose width is slightly greater than the width of tangs 71 and 79, and an outer flange 195, which is fixedly attached only to the edge 81 of output clutch disc 75, at its inner periphery whereby it rotates with said output clutch disc 75, and a pop-out detent pin 197, having its inner end connected to said flange 195 and its outer end slidably connected through a hole in said housing 32 whereby its outer end becomes visible if the output torque limit has been exceeded.

In the operation of the dual torque limiter/no-back device 21 as herein described and shown in FIGS. 1 to 16, inclusive, rotation of input shaft 35 by a source of rotary power (not shown) is transmitted to cam plate 83 which is keyed to the input shaft for conjoined rotation therewith by way of the inter-connection of aperture 95 of the cam plate (see FIG. 2) with the shaft flats 41 and 43. The rotation of cam plate 83 is transmitted, through balls 97 and inclined detents or ramps 157 and 167, to output drive member 75. The rotation of output drive member 75 is transmitted, via its driving tangs 79, to output means 27 by abutment of the tangs against the sides of complementary slots 55 of output means 27. This transmission of torque continues as long as the torque load remains below a value determined by springs 91 and torque adjusting assembly 87. When the torque load on output means 27 approaches the predetermined value, cam plate 83 begins to override output disc 75 and if the torque load continues to increase, further overriding of drive disc 75 occurs. Simultaneously, lugs or tangs 71 of input disc 69 of input drive member 65 angularly overrides output disc 75 so that the lost motion space between tangs 71 and their associated slots 149 in input coupling member 143 is closed and tangs 71 abut the sides of slots 149 to thus rotate member 143 and cause the latter to angularly override output coupling member 141. This rotation of member 143 relative to member 141 forces, via balls 145 coacting with inclined ramp surfaces 187 and 175, output coupling member 141 and input coupling member 143 axially apart. This axial movement compresses brake plates 115 and 117 of minor brake pack 113 and major brake pack 11, respectively, together and thereby locking both output means 27 and input shaft 25 against rotation. These above described torque limiting and no-back functions are the same regardless of the direction of torque transmission. In the operation of the device 21, when a torque force or load is applied to output means 27 in excess of that of the inputs means 25, e.g. when no torque is applied to the input means, or a reverse torque load is applied to output means 27, such torque force applied to the output means 27 will not effect any but a very slight rotative movement. This no-back function is achieved because a torque load applied to output means 27 will cause a slight rotative movement of coupling member 141 by reason of the spline interconnection between it and cup-shaped portion 51 of the output means 27. This rotative movement of output coupling member 141, via balls 145 coacting with ramps 175 and 187, in turn, causes compression of brake plates 115 and 117 of major brake pack 111 to thereby prevent further rotation of output means 27 under the torque load applied to the latter.

When torque is applied to input shaft 25 of sufficient value to cause cam plate 83 to override output drive member or disc 75 and thereby bring balls 97 initially to the inner end portions of first inclined sections or ramps 165 of sockets 157 in output drive disc 75 and cam plate 83 and finally to seat in first portions 159, the torque applied to input shaft 25 is transmitted to the output means 27 via cam plate 83, balls 97, drive disc 75, driving tangs 79 and the latter's engagement of cup-shaped portion 51 of the output means 27 as has been previously described.

Figure 17:
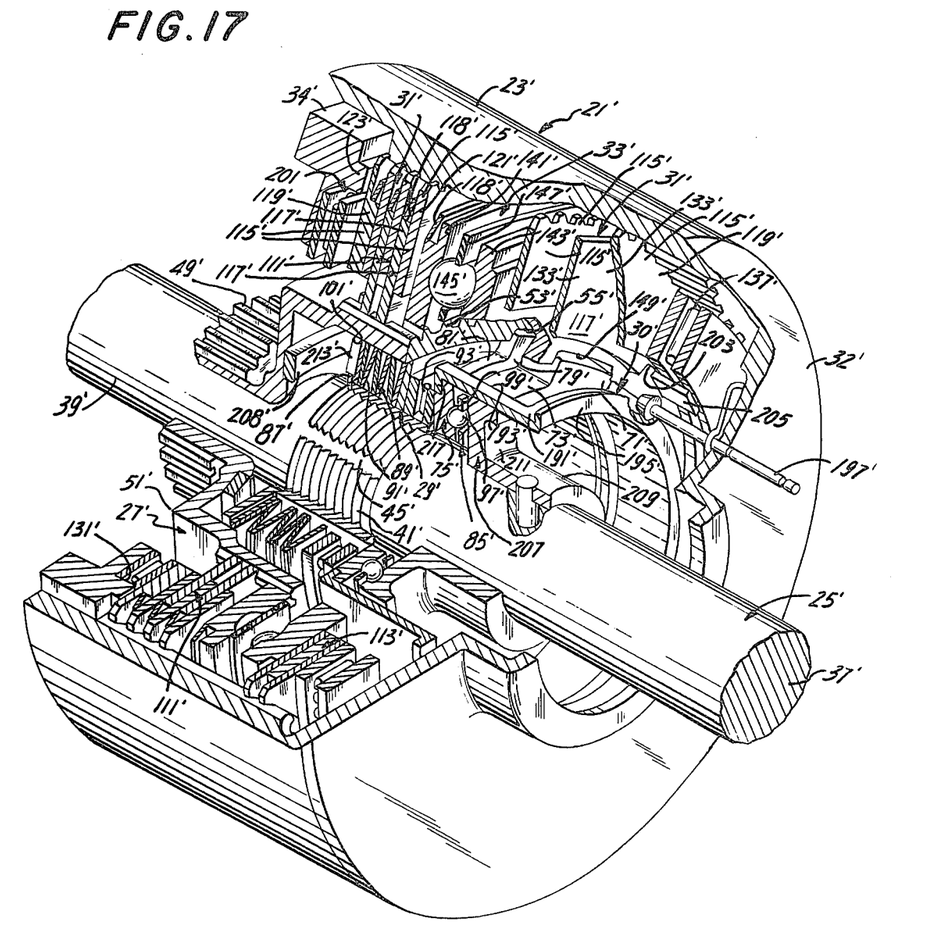
FIG. 17 is a perspective view of another embodiment of the present invention.
Figure 18:
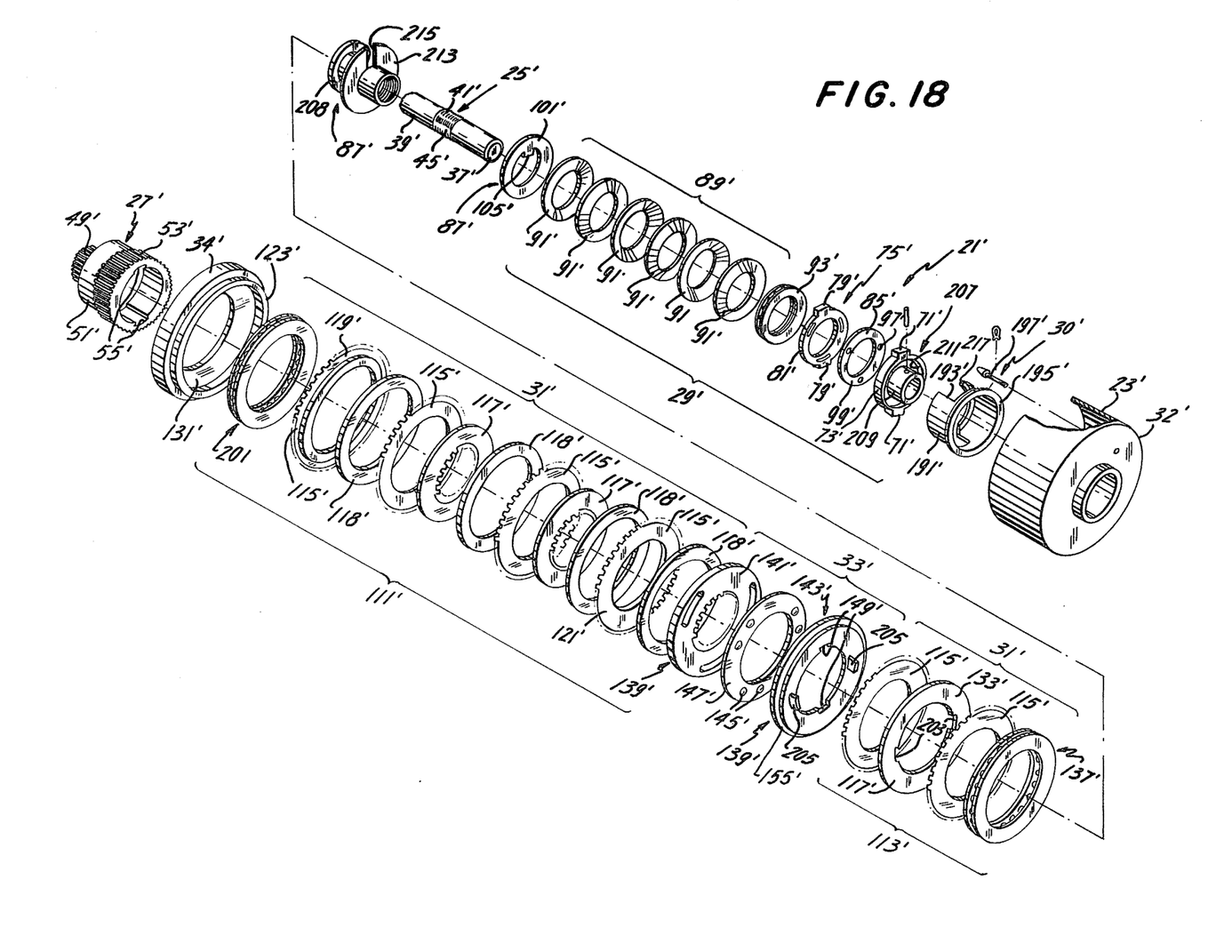
FIG. 18 is a perspective exploded view of the invention shown in FIG. 17.

Referring now to FIGS. 17 and 18, which illustrate another embodiment of the invention, which embodiment is essentially the same as the preferred embodiment illustrated in FIGS. 1–16, and differs primarily in the drive coupling assembly utilized, and accordingly the same reference numbers with a prime added shall be used for those parts which correspond to the same parts used in the preferred embodiment. The dual torque limiter/no-back 21' comprises seven major subassemblies, a casing or housing assembly 23', and input means or input shaft 25' supported for rotation in said casing 23', and output means 27' coupled to a driven member or load (not shown), and supported for rotation in said casing 23', a drive coupling assembly designated generally 29' connected to said input shafts 25' and said output means 27' for transmitting torque from the input shaft 25' to the output means 27', which drive coupling assembly 29' includes a torque responsive means operative at a predetermined torque value, a brake means or brake assembly or brake designated generally as 31', disposed in said casing 25' and operative to positions of engagement or braking and disengagement or unengagement, and a coupling means or brake coupling assembly, designated generally as 33', for connecting the drive coupling assembly 29', said output means 27', and said brake 31' to effect engagement of said brake 31' upon said predetermined torque transmitted from the load. An indicator assembly 30' is connected to the drive coupling assembly 29'.

To be more specific, the casing assembly 23' comprises an internally splined housing 32' suitably connected to an end plate closure member 34'. Input shaft 25' comprises an elongated shaft rotatably mounted having an outer and inner end 37' and 39', respectively, inner threaded portion 41', which includes a slot 45'; its inner end 37 is rotatably mounted by conventional means, such as a bearing (not shown) in the housing 32'. The output means 27' comprises an outer, tubular output drive gear portion 49' extending through the end plate closure member 34' of the casing 23' and an inner, cup-shaped portion 51' extending within the casing's housing 32' and having a spline 53' formed on the top surface of its inner end extending completely around its circumference and a pair of diametrically opposing slots 55' formed in its lower surface; the output drive gear 49' is connected to a conventional coupling member, such as a tubular, inner toothed coupling member (not shown) conventional mounted, as by a bearing (not shown) in the end plate closure member 34', and is coaxially and rotatably mounted on an inner end 39' of the input shaft 25' by conventional means, such as a bearing (not shown) carried by said input shaft 25'.

The drive coupling assembly 29' comprises an input drive member 207, an output drive disc or output drive member 75', ball and retainer assembly 85', torque locking and adjusting assembly 87', and spring means 89'. The input drive member 207 has a sleeve or hub portion 209 which is fixed to input shaft 25' by a pin connection and has an input disc portion or input member 211 having a pair of diametrically opposed driving lugs or tangs 71' radially extending from the outer periphery or outer edge 73' of the input drive member 207. The output drive disc 75' is spaced from and rotatively and slidably mounted coaxially with respect to input shaft 25' and disposed axially from opposing input clutch member 207. Output drive disc 75' has a pair of diametrically opposed output driving lugs or tangs 79' radially extending from the outer periphery or outer edge 81' of the output drive disc 75' which fit loosely within complementary slots 55' of output means 27'. The spring means 89' comprises a series of discs or Belleville spring washers designated generally 91' which coaxially surround the input shaft 25', and its inner end engages a thrust washer and bearing assembly 93' which is disposed against an outer face of output drive disc 75' and its outer end slidably engages the locking and adjusting assembly 87', which engages, at its outer end, a thrust washer 208. When the Belleville spring washers 91' are disposed against the outer face of output drive disc 75', through thrust washer and bearing assembly 93', they are compressed and urge said output drive disc 75' toward the input drive member 207. Disposed between said input drive member 207 and rotatably supporting said output drive disc 75' is a conventional ball and retainer assembly 85' (which also is supported by said input drive member 207) which comprises a plurality of balls or rolling elements 97', preferably three, and a disc shaped ball retainer 99' which supports and retains these balls 97' at equally spaced intervals around its circumference and into a plurality of complementary configured ball detent sockets, described infra, formed in opposing faces of input drive member 207 and output drive disc 75'. The torque locking and adjusting assembly 87' comprises a lock washer 101' having a single circumferentially spaced lower key 105' and an abutting adjustment retainer nut 213 having a single slot 215 formed therein. The nut 213 engages the threaded portion 41' of input shaft 35' and abuts lock washer 101' whose lower key 105' is adapted to be bent through said slot 215 of the nut 213 into slot 45' of threaded portion 41'. The compression of the Belleville spring washers 91' can be changed or adjusted by axially positioning the adjustment nut 213 to any position on the threaded portion 41' to provide for a predetermined torque limiting value or setting.

The brake 31' comprises separately and oppositely disposed major brake pack 111' and a minor brake pack 113', both of which are connected to the housing 32' and between which the coupling means 33' is disposed. The major brake pack 111' comprises a first series of brake plates or discs 115' in the form of annular plates having their outer periphery engaging the splined housing 32' for slidable axial movement on its spline. A second series of brake plates or discs 117', also in the form of annular plates but having their inner periphery engaging the output means' spline 53' for slidable axial movement thereupon are interleaved with the first series of brake discs 115'. A series of wave spring washers or biasing means for maintaining the brake means 31' disengaged in the absence of torque from the input means 25' during the transmission of all torque from the input means 25' below a predetermined torque, 118', are interleaved between the first series of brake plates 115' in the spaces above the top edges of the second series of brake plates 117' and between a shoulder of an outermost or end brake plates 119' of the first series of brake plates 115' and its adjacent brake plate of the same series as well as between an innermost brake plate 121' of this series and the shoulder of an adjacent member of the brake coupling assembly 33', described infra. These wave spring washers 118' maintain the brake means 31' disengaged by maintaining minimum clearance between the brake plates. The outermost brake plate 119' is sufficiently spaced from an upper inner end or flange 123' of end plate closure member 34' to prevent any reaction therebetween and abuts and reacts against a thrust washer and bearing assembly 201 which is coaxially mounted below said flange 123' and abuts against a shoulder portion 131' of said end plate closure member 34'. The minor brake pack 113' is similar to the major brake pack 111' but primarily differs therefrom in that half the number of brake elements are utilized. It also includes a first series of brake plates 115', two in number, engaging the splined housing 32' for slidable movement and a single brake plate or disc 133', disposed between said two adjacent brake plates 115' in the form of an annular plate but having a pair of diametrically opposed slots 203 radially formed in its inner periphery and which is supported by brake coupling assembly 33', described infra, for rotational and axial movement. Another series of wave spring washers (not shown) may be interleaved between the two brake plates 115' and the shoulder of an adjacent member of the brake coupling assembly 33', described infra, to function as biasing means for the same general purpose as the corresponding wave spring washers 118' of the major brake pack 111'. Its outermost brake plate 119' abuts and axially reacts against a thrust washer and bearing assembly 137' coaxially disposed between said aforementioned brake plate 119' and the inner face of the end wall of housing 32' and is coaxially supported for rotational and axial movement by brake coupling assembly 33'. Thrust bearing assembly 137' of the minor brake pack 113' provide an axial braking surface, without restricting rotative motion, for the brake plates when they are compressed into pressure engagement with each other by the input coupling member 143', when the minor brake pack 113' is actuated. Furthermore, since such thrust bearing assembly 137' is under compression when the minor brake pack 113' is actuated, it assists in releasing said minor brake pack 113' when the operative conditions for engaging said minor brake pack 113' are no longer present, by axially moving their brake plates inwardly thereby tending to disengage said minor brake pack 113' and resetting it to its disengaged position. The thrust washer and bearing assembly 201 serve generally the same purpose for the major brake pack 111'.

The brake coupling assembly 33' functions to effect engagement of the brake 31' only upon said predetermined torque value and only upon any torque transmitted from the driven means or load and independent of the level of torque at the input means 25'. Furthermore, the brake coupling assembly 33' rotatively moves, in response to the drive coupling assembly 29', during the transmission of all torque from the input means 25', regardless of the level of torque so long as it is below said predetermined value. It also rotatively moves in response to the output means 27' upon any level of torque being transmitted therethrough from the driven means or load. More specifically, the brake coupling assembly 33' comprises camming means or a pair of interrelated members designated generally 139', mounted for both conjoined rotational movement with and on said drive coupling assembly 29' and for separate and independent axial movement with respect to assembly 29' and disposed coaxially therewith. The camming means 139' comprises a pair of annular, disc-shaped, opposing output and input coupling members, 141' and 143', respectively, a plurality of balls 145', preferably three pair, and a disc-shaped ball retainer 147' which supports and retains each pair of balls 145' at equally spaced intervals around its circumference and into a plurality of pairs of complementary configured ball detent sockets, described infra, formed in opposing faces of coupling members 141' and 143'. The output coupling member 141' is disposed coaxially to said output means 27' and is mounted upon said output means 27' at its inner periphery which engages the output means spline 53' for both independent slidable axial movement thereupon and conjoined rotation therewith and said associated brake plates 115' and slidable axial movement with both series of brake plates 115' and 117' of major brake pack 111'. The input coupling member 143' is disposed coaxially to input drive disc 211 of the input drive member 207 and includes a pair of diametrically opposing slots 149' formed in its lower peripheral edge and within which the complementary tangs 71' of input drive disc 211 fit loosely, thereby engaging the input drive disc 211 for both independent slidable axial movement thereupon and conjoined rotation therewith. The input coupling member 143' further includes, in its outer face at its lower peripheral edge, a pair of axially or traversely extending arcuate driving tangs 205, within which complementary slots 203 of said minor brake pack's brake plate 133' fit loosely, thereby engaging said brake plate 133' for conjoined rotation and slidable axial movement therewith and slidable axial movement with the associated brake plates 115' of said minor brake pack 113'.

The indicator assembly 30', connected to the drive coupling assembly 29', comprises a cylindrical member 191', having an enlarged slot 193' whose width is slightly greater than the width of tangs 71' and 79', and an inner flange 217 (and an outer flange 195') which is fixedly attached only to the shoulder portion of edge 81' of output disc 75', at its inner periphery whereby rotates with said output disc 75', and a pop-out detent pin 197', having its inner end connected to said flange 195' and its outer end slidably connected through a hole in said housing 32' whereby its outer end becomes visible if the output torque limit has been exceeded.

Figure 19:
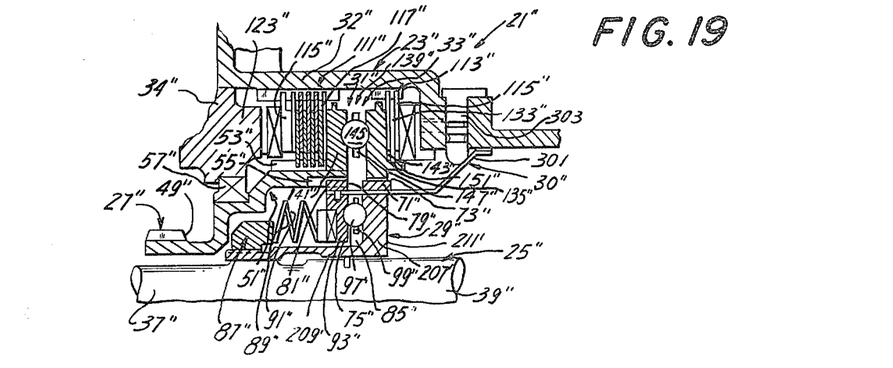
FIG. 19 is a simplified fragmentary axial cross sectional view of another embodiment of the present invention.

Referring now to FIG. 19, which illustrates a portion of another, simplified, embodiment, which is essentially the same as the embodiment illustrated in FIGS. 17 and 18; accordingly, the same reference numerals with a double prime added shall be used for those parts which correspond to the same parts used in said embodiment except that reference numerals in the two hundreds shall only carry a single prime. The dual torque limiter/no-back 21" comprises seven major subassemblies, a casing or housing assembly 23", and input means or input shaft 25" supported for rotation in said casing 23", and output means 27" coupled to a driven member or load (not shown), and supported for rotation in said casing 23", a drive coupling assembly designated generally 29" connected to said input shaft 25" and output means 27", for transmitting torque from the input shaft 25" to the output means 27", which drive coupling assembly 29" includes a torque responsive means operative at a predetermined torque value a brake means or brake assembly or brake designated generally as 31", disposed in said casing 25" and operative to positions of engagement or braking and disengagement or unengagement, and a brake coupling assembly, designated generally as 33", for connecting said drive coupling assembly 29", said output means 27", and said brake 31" to effect engagement of said brake 31" upon said predetermined torque value and for effecting engagement of said brake 31" upon torque transmitted from the load. An indicator assembly 30" is connected to said assembly 29".

To be more specific, the casing assembly 23" comprises a splined housing 32" with an end plate closure member 34". Input shaft 25" comprises an elongated shaft rotatably mounted having outer and inner ends 37" and 39", respectively. The output means 27" comprises an outer, tubular output drive gear shaft portion 49" extending through the end plate closure member 34" of the casing 23" and an inner, cup-shaped portion 51" extending within the casing's housing 32" and having a spline 53" formed on the top surface of its inner end extending completely around its circumference and a pair of diametrically opposing slots 55" formed in its lower surface; the output drive shaft 49" is received in bearing 57" in the end plate closure member 34", and is coaxially and rotatably mounted on an inner end 39" of the input shaft 25".

The drive coupling assembly 29" comprises an input drive member 207', an output drive disc or output drive member 75", ball and retainer assembly 85", torque locking and adjusting assembly 87", and spring means 89". The input drive member 207' has an inwardly positioned sleeve or hub portion 209' which is fixed to input shaft 25" by a pin connection and has an input disc portion of input disc 211' having a pair of diametrically opposed driving lugs or tangs 71" radially extending from the outer periphery or outer edge of the input disc 211'. The output drive member or output drive disc 75" is spaced from and rotatively and slidably mounted coaxially with respect to input shaft 25" and disposed axially from opposing input disc 211'. Output drive disc 75" has a pair of diametrically opposed output driving lugs or tangs 79" radially extending from the outer periphery or outer edge 81" of the output drive disc 75" which fit loosely within complementary slots 55" of output means 27". The spring means 89" comprises a series of discs or Belleville spring washers designated generally 91" which coaxially surround the input shaft 25" and a thrust washer and bearing assembly 93" which is disposed against an outer face of output drive disc 75". When the Belleville spring washers 91" are disposed against assembly 87" and slidably engage it and the outer face of output drive disc 75", through thrust washer and bearing assembly 93", they are compressed and urge said output drive disc 75" toward input drive member 207'. Disposed between input drive member 207' and rotatably supporting output disc 75", is a conventional ball and retainer assembly 85" which also is supported by input drive member 207' which comprises a plurality of balls or rolling elements 97" preferably three, and a disc-shaped ball retainer 99" which supports and retains these balls 97" at equally spaced intervals around its circumference and into a plurality of complementary configured ball detent sockets, described infra, formed in opposing faces of input drive member 207' and output drive disc 75". The compression of the Belleville spring washers 91" can be changed or adjusted by axially positioning the locking and adjustment assembly 87" to any position on the shaft 25" to provide for a predetermined torque limiting value or setting.

The brake 31" comprises separately and oppositely disposed major brake pack 111" and a minor brake pack 113", both of which are connected to the housing 32" and between which the brake coupling assembly 33" is disposed. The major brake pack 111" comprises a first series of brake plates or discs 115" in the form of annular plates having their outer periphery engaging the splined housing 32" for slidable axial movement on its spline. A second series of brake plates or discs 117", also in the form of annular plates but having their inner periphery engaging the output means spline 53" for slidable axial movement thereupon are interleaved with the first series of brake discs 115". A series of wave spring washers or biasing means (not shown) for maintaining the brake 31" disengaged in the absence of torque from the input means 25" during the transmission of all torque from the input means 25" below a predetermined torque, are interleaved between the first series of brake plates 115" in the spaces above the top edges of the second series of brake plates 117" and between a shoulder of an outermost or end brake plate of the first series of brake plates 115" and its adjacent brake plate of the same series as well as between an innermost brake plate of this series and the shoulder of an adjacent member of the coupling means 33", described infra, and they also maintain minimum clearance between the brake plates. The outermost brake plate abuts and reacts against an upper inner end or flange 123" of end plate closure member 34", through a thrust washer and bearing assembly which assembly is coaxially mounted in front of flange 123". The minor brake pack 113" is similar to the major brake pack 111" but primarily differs therefrom in that half the number of brake elements are utilized. It also includes a first series of brake plates 115", two in number, engaging the splined housing 32" for slidable movement and a single brake plate or disc 133", disposed between said two adjacent brake plates 115" in the form of an annular plate but having a pair of diametrically opposed lugs or tangs 135" radially extending from its inner periphery and which is supported by brake coupling assembly 33", described infra, for rotational and axial movement. Another series of wave spring washers (not shown), two in number, are also interleaved between the two brake plates 115" and the shoulder of an adjacent member of the coupling means 33", described infra and also function as biasing means for the same general purpose as the corresponding wave spring washers of the major brake pack 111". Its outermost brake plate abuts and axially reacts against a thrust washer and bearing assembly coaxially disposed between said aforementioned brake plate and the inner face of the end wall of housing 32" and is coaxially supported for rotational and axial movement by brake coupling assembly 33".

The brake coupling assembly 33" functions to effect engagement of the brake 31" only said predetermined torque value and only upon any torque transmitted from the driven means or load and independent of the level of torque at the input means 25". Furthermore, the coupling means 33" rotatively moves, in response to the drive coupling assembly 29", during the transmission of all torque from the input means, regardless of the level of torque so long as it is below said predetermined value. It also rotatively moves in response to the output means 27" upon any level of torque being transmitted therethrough from the driven means or load. More specifically, brake coupling assembly 33" comprises camming means or a pair of interrelated members designated generally 139", mounted for both conjoined rotational movement with and on drive coupling assembly 29" and for separate and independent axial movement with respect to the assembly 29" and disposed coaxially therewith. The camming means 139" comprises a pair of annular, disc-shaped, opposing output and input coupling members, 141" and 143", respectively, a plurality of balls 145", preferably three pair, and a disc-shaped ball retainer 147" which supports and retains each pair of balls 145" at equally spaced intervals around its circumference and into a plurality of pairs of complementary configured ball detent sockets, described infra, formed in opposing faces of coupling members 141" and 143". The output coupling member 141" is disposed coaxially to said output means 27" and is mounted upon said output means 27" at its inner periphery which engages the output means' spline 53" for both independent slidable axial movement thereupon and conjoined rotation therewith and said associated brake plates 115" and slidable axial movement with both series of brake plates 115" and 117" of major brake pack 111". The input coupling member 143" is disposed coaxially to said input drive member 207' and includes a pair of diametrically opposing slots (not shown) formed in its lower peripheral edge, within which the complementary tangs 71" of said input drive member 207' fit loosely, thereby engaging the input drive member 207' for both independent slidable axial movement thereupon and conjoined rotation therewith. The input coupling member 143" further includes, on its outer face near its lower edge, two pairs of axially or traversely extending arcuate driving tangs 151" and within which complementary tangs 135" of said minor brake pack's brake plate 133" fit loosely within thereby engaging said brake plate 133" for conjoined rotation and slidable axial movement therewith and slidable axial movement with the associated brake plates 115" of said minor brake pack 113".

The indicator assembly 30", connected to drive coupling assembly 29", comprises an L-shaped rod member 301, having its inner end connected to said input coupling member 143" and its outer end slidably connected to a trip-indicator or pop-up button 303 in housing 32" whereby its upper end becomes visible it the output torque limit has been exceeded.

The device 21 operates in three different modes in the preferred embodiment, FIGS. 1-16; normal transmission, where the input torque is below a predetermined torque level, torque limiting, when either the output torque or the input torque exceed the predetermined torque level, and no-back, when torque transmitted from the driven means through the output means is blocked. In the latter two modes the brake means is engaged, whereas it is unengaged during the normal transmission mode. Furthermore, during the no-back mode of operation only the brake means is involved whereas during torque limiting both the drive coupling assembly and the brake means are involved. Referring now particularly to the preferred embodiment illustrated in FIGS. 1-16, the three different modes of operation will be described. During normal transmission, when the input torque is below a predetermined torque level, applying torque in either direction to the input shaft 25, results in said torque being transmitted through the drive coupling assembly 29, from the inner side of input drive member 65, through the rotatable Belleville spring washers 91 which maintain balls 97 in their detent sockets' first portion 159, and thrust washer and bearing assembly 93 to the inner side of rotatable output drive disc 75, to the output means 27, through the output drive disc's tangs 79 and the output means' 27 complementary slots 55. Since neither of these two inputs and output members, 65 and 75, respectively, rotate relative to each other, nor with respect to cam plate 83, in this mode all three of these elements are aligned and the two former mentioned members' tangs 71 and 79, respectively, are also aligned, and said tangs operating through the output means' spline 53, which engages output coupling member 141, and the input coupling members' complementary slots 149, respectively, align said output and input coupling members, 141 and 143, respectively, whereby their camming balls 145 are positioned in their respective ball detent sockets 171 and 183 so that the brake coupling assembly 33 is at its minimum axial spacing and since the wave spring washers 118 maintain minimum clearance between the brake plates there is no pressure engagement between them and hence the brake 31 is maintained unengaged. Accordingly, the brake coupling assembly 33, including output and input coupling members 141 and 143, respectively, is driven by drive coupling assembly 29 and rotates freely with the latter without engaging the brake 31 in conjoined rotation. Angular backlash occurring during this normal transmission mode, between the tangs and slots of the clutch elements, and the output's cup-shaped portion and the input coupling member, 51 and 143, respectively, are reduced to a minimum by appropriate design, preferably by providing a loose fit therebetween, thereby permitting axial slidable movement between these elements and members. It should be noted that in regard to all drive coupling assemblies of the ball-detent type, a minimum initial input torque is required before any output torque is transmitted through said drive coupling assembly that is, a minimum amount of input torque is required to overcome the forces due to static friction when the device is at rest and they are dependent upon the coefficient of friction of the various materials used in the design of the faces of the drive coupling and it interacting ball elements.

During the no-back mode of operation, the brake coupling assembly 33 is responsive to the output means 27 for actuating the brake 31 only upon torque being transmitted from the driven means that is, when the output load or driven means is aiding, trying to drive the input through the output means 27, the output coupling member 143 is rotatably driven thereby causing relative angular displacement between it and its interrelated element, input coupling member 143. Such angular displacement of the coupling members 141 and 143, can occur because the output means 27 can rotate slightly ahead of the input shaft 25 because of the loose fit or built in clearance between the output and input drive members' tangs, 79 and 71, respectively, and their complementary slots 55 and 149, respectively, of output means 27 and input coupling member 143, respectively. Since the minor brake pack 113, associated with the input coupling member 143 is slightly loaded by only two wave spring washers 118 between its splined brake plates 115, it will be the first to provide an initial braking action or engagement thereby tending to keep its associated coupling member, input coupling member 143, from rotating as the camming balls 145 start up their ramps' 185 inclined section 187. The magnitude of torque required to initiate such braking action by the minor brake pack 113 is quite low and is referred to as the energizing torque. As the output coupling member 141 continues to rotate with respect to the input coupling member 143, it is displaced axially as the camming balls 145 continue to ride further up inclined sections 187 of their ramps 185 thereby rapidly engaging the major brake pack 111 through its back surface. Then input rotation of the input shaft 25 will be in a direction to drive one of the coupling members, 143 and 141, into alignment with the other, through one of the drive member's tang's 71 and 79, thereby tending to release the brake 31. These forces become balanced and the aiding load torque is absorbed by the brake's brake plates. The magnitude of input torque required to release the engaged brake 31, in the absence of any torque from the load, is also quite low, and equals the aforementioned energizing torque, and which, under aiding load conditions, minimizes the tendency of the brake to chatter.

During the torque limiting mode, the brake coupling assembly 33 is responsive to the drive coupling assembly 29 for actuating the brake 31 only when the predetermined torque level is reached. This predetermined torque level is set by the drive coupling assembly 29 and, more particularly, by the preload force applied to the output drive disc or output drive member 75 by the spring means 89, which is disposed between the output and input drive discs or members, 75 and 65, respectively, and which comprises a series of Belleville spring washers 91, which preload force is, in turn, set by the locking and adjusting assembly 87, described in detail supra. The balls 97 in the detent sockets 157 of output drive disc 75 and cam plate 83 act at an angle to transmit torque and when the torque at the output drive disc 75 reaches the predetermined level, "lockout" occurs; that is the balls 97, in their first portion 159 of detent sockets 157, move out of their position from their first inclined section 165 of ramp 163 to their second inclined section 167, which has a lower cam angle, thereby permitting relative angular rotation to occur between the output drive disc 75 and cam plate 83 while increasing their axial displacement with respect to each other, thereby further compressing the series of Belleville spring washers 91 which engage the inner face of the former member. The point or torque magnitude at which lockout occurs is dependent upon the angle of the ramp's first inclined section 165, the radius of the balls 97, as well as the established level of preload spring force.

When the torque at the output means 27 reaches the predetermined torque level, lockout occurs as previously described, resulting in the output drive disc 75 separating from, and rotating relative to the cam plate 83. However, the input drive member 65 rotates forward with respect to the output drive disc 75 which is being retarded by the torque on the output means 27, thereby driving the input coupling member 143 connected thereto, and causing it to rotate relative to said output coupling member 141 which is also being retarded by the torque on the output means 27, thereby causing axial displacement between said coupling member 143 and 141 and resulting in the brake 31 being quickly engaged to lock the input drive member 65 to the housing 32. Such rapid response to any overload, as well as to torque applied through the output means 27, is a result of the minimum clearance maintained between the brake's brake plates by the interleaved wave spring washers 118. Therefore, any excess input torque; that is, any torque above the predetermined torque level, is taken into the brake 31 and grounded out. Torque to the output is thereby limited to the predetermined torque level. If the over-torque or jam condition persists on the output, the input will be blocked out by the aforedescribed braking action thereby protecting the output from damage. Axial motion of the output drive disc 75, toward the input drive member 65, due to the predetermined torque level being exceeded, results in the detent pin 197, which is, in turn connected to the output drive disc 75, moves the detent pin 197 axially thereby causing its outer end to extend beyond the housing 32 thereby visually indicating that an over-torque condition has occurred. This pin 197 is held in its extended position even after the torque decreases below the predetermined torque level by suitable, conventional detent spring means, which can be manually reset from outside the housing 32 by pushing it back in place after the source of the overload on the device's output is removed; that is, when the torque decreases below the predetermined torque level, both the drive coupling assembly and the brake 31 automatically reset, without any necessity of reversing, the input drive. The drive coupling assembly 29 resets under these conditions as the thrust washer and bearing assembly 93 function to provide rotational rolling contact between the inner face of the output drive disc 75 and the outermost Belleville spring 91 of the spring means 89, thereby permitting the output drive disc 75 to rotate back into alignment with its opposing cam plate 83 due to the previously compressed series of Belleville spring washers expanding and forcing output drive disc 75 toward cam plate 83 and forcing the plurality of balls 97 into their detent sockets' first portion 159.

Since the other embodiments of the invention illustrated in FIGS. 17-19 are essentially the same as the preferred embodiment illustrated in FIGS. 1-16, their modes of operation will not be described.

While only certain embodiments of this invention has been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent in the United States is:

1. In a device for limiting torque and for preventing transmission of torque from a driven member comprising:
   (a) a casing,
   (b) an input means supported for rotation in said casing,
   (c) an output means coupled to said driven member to drive the latter and supported for rotation in said casing,
   (d) a first coupling means connected to said input means and output means for transmitting torque from said input means to said output means and including torque responsive means operative at a predetermined torque load to interrupt transmission of torque from the input means to the output means,
   (e) brake means disposed in said casing and operative to positions of engagement and disengagement,
   (f) second coupling means connected to and coacting with said first coupling means, said output means and said brake means to effect engagement of said brake means upon said predetermined torque load and for effecting engagement of said brake means upon torque transmitted from the output means, and
   (g) said second coupling means includes:
      (g-1) a first rotatable element connected for conjoined rotation with the output means,
      (g-2) a second rotatable element spaced from said first rotatable element and connected to the input means for conjointed rotation with the input means.
      (g-3) said first and second rotatable elements being supported for axial movement relative to each other, and
      (g-4) cam elements disposed between and engaging said first and second rotatable elements so that, upon relative rotation of said first and second rotatable elements, such rotatable elements are axially moved relative to each other to thereby effect actuation of the brake means to the engaged position.

2. The apparatus of claim 1 wherein said brake means includes two separate brake assemblies with one disposed adjacent the first rotatable element and the other brake assembly disposed adjacent the second rotatable element so that upon relative axial movement of said first and second rotatable elements both brake assemblies are actuated to an engaged position.

3. The device of claim 1 wherein said first and second rotatable elements are discs having juxtaposed face portions and wherein said cam elements are a plurality of circumferentially spaced balls each of which engages a recess in at least one of said face portions of the discs and each recess having at least one inclined bottom surface against which the associated ball moves upon relative rotative movement of the discs and thereby forces the discs to move axially relative to each other.

4. The apparatus of claim 1 wherein said brake means includes a plurality of discs with alternate discs fixed against rotation and the other discs connected to the output means and input means for conjoined rotation therewith.

5. The apparatus of claim 1 wherein said brake means includes biasing means for maintaining the brake means in a normally disengaged position.

6. The device as in claim 1 wherein said brake means includes biasing means for maintaining the brake means disengaged during the transmission of all torque from the input means below said predetermined torque load.

7. The apparatus of claim 1 wherein said output means is a shaft having a cup-shaped end portion coaxial with the input means and overlying said first coupling.

8. The apparatus of claim 7 wherein said first coupling means includes a rotatable disc having at least one radially extending tang and wherein said cup-shaped end portion has a slot for receiving said tang so that rotation of the disc is transmitted to the output means.

9. The apparatus of claim 1 wherein an indicator means is disposed adjacent said first coupling means and is actuated by said torque responsive means when the latter becomes operative at said predetermined torque load.

10. The apparatus of claim 1 wherein said first coupling means comprises two rotatable discs, one disc being connected to said input means to be rotated by the latter and the other disc connected to the output means to rotate the latter, one of said two rotatable discs being supported for axial movement relative to the other rotatable disc, camming means interposed between juxtaposed faces of the two rotatable discs for axially moving the axially movable disc upon relative rotative movement of the discs, and biasing means for urging the axially slidable disc toward the other disc to thereby transmit rotation from one disc to the other at torque loads below the said predetermined torque load.

11. The apparatus of claim 10 wherein said input means includes a rotatable shaft and a collar having a radially extending flange secured to said shaft for conjoined rotation with the latter and wherein said biasing means is a spring which abuts at one end said axially slidable disc and at the opposite end the flange of said collar.

12. The apparatus of claim 10 wherein said first coupling means also includes an adjustment means for regulating the force of said spring to a desired predetermined torque load at which transmission of torque will be interrupted.

13. The apparatus of claim 10 wherein an abutment is carried by the output means and wherein said biasing means is a spring which abuts at one end said axially slidable disc and at the opposite end said abutment.

14. The appartus of claim 10 wherein a collar having an abutment is secured to the input means to be rotated by the latter and wherein said biasing means is a spring which abuts at one end said axially slidable disc and at the opposite end the abutment of said collar.

15. The apparatus of claim 1 wherein said brake means comprises two sets of a plurality of adjacent rings with alternate rings fixed to the casing to thereby be fixed against rotation and in one set the other rings being connected to be rotated by said input member and in the other set the other rings being connected to be rotated by said output member.

16. The apparatus of claim 1 wherein said first coupling means comprises a first and second rotatable discs, a plurality of balls disposed between the rotatable discs and engaging first axial camming surfaces carried by at least one of said first and second rotatable discs, said first and second rotatable discs being mounted for axial and rotational movement relative to each other, biasing means for urging said first and second discs axially toward each other, said balls coacting with said discs to transmit rotation therebetween below said predetermined torque load imposed by said biasing means and to allow relative rotation between said first and second discs when said predetermined torque load occurs to thereby interrupt torque transmission and actuation of said brake means.

* * * * *